Figure 2:
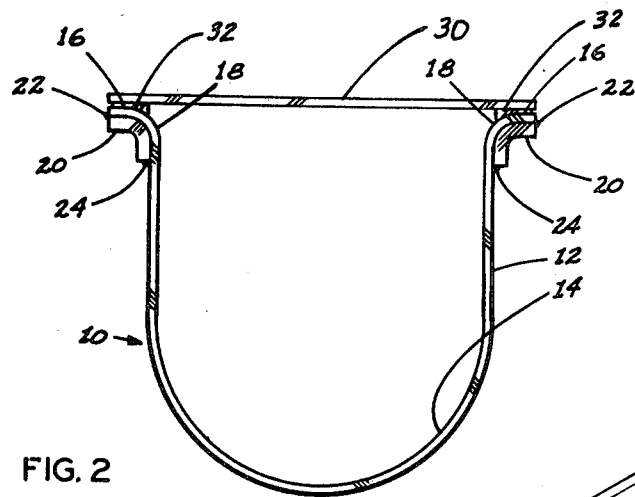

United States Patent [19]

Buss

[11] 4,445,260

[45] May 1, 1984

[54] METHOD OF MANUFACTURE FOR METAL TROUGH

[76] Inventor: David L. Buss, 120 E. Kraus St., St. Louis, Mo. 63111

[21] Appl. No.: 491,736

[22] Filed: May 5, 1983

Related U.S. Application Data

[62] Division of Ser. No. 186,899, Sep. 15, 1980.

[51] Int. Cl.³ .................. B21D 19/14; B21D 51/04
[52] U.S. Cl. .............................. 29/157 R; 138/163; 228/155; 228/214
[58] Field of Search ............... 228/155, 184, 214; 138/163; 29/157 R

[56] References Cited

U.S. PATENT DOCUMENTS

| | | | |
|---|---|---|---|
| 1,133,692 | 3/1915 | Adams | 193/2 R |
| 2,386,246 | 10/1945 | Mapes | 228/155 |
| 3,433,269 | 3/1969 | Sackett, Sr. | 52/731 |
| 4,090,604 | 5/1978 | Reifert | 198/657 X |
| 4,101,065 | 7/1978 | Novikov et al. | 228/155 |
| 4,349,220 | 9/1982 | Carroll et al. | 138/163 X |

FOREIGN PATENT DOCUMENTS 125748  4/1919  United Kingdom ................. 52/730

OTHER PUBLICATIONS

"Welding Terms and Definitions," AWS publication A30-76, American Welding Society, Miami, Florida, 1976.

*Primary Examiner*—Kenneth J. Ramsey
*Attorney, Agent, or Firm*—John D. Pope, III; Edward R. Weber

[57] ABSTRACT

A flanged trough is provided having flanges along each side of the trough with a smooth continuous curve between the flanges and the body of the trough and a bar of metal welded along the underside of each longitudinal edge of the metal sheet before the flanges are formed. The junction between the metal bars and the flanges and the welds can be covered with a sealant to form a sanitary seal. A lid and gasket can be placed over the trough to seal the contact area of material in the trough from the junction between the metal bars and the flanges of the trough to form a weather-tight, dust-tight and gas-tight conduit.

8 Claims, 3 Drawing Figures

U.S. Patent      May 1, 1984      4,445,260

METHOD OF MANUFACTURE FOR METAL TROUGH

This is a division of pending prior application Ser. No. 186,899, filed Sept. 15, 1980.

The present invention relates to a metal trough and its method of manufacture, and particularly to the flanges of a metal trough.

Flanges for a metal trough are typically of two types, the angle flange and the formed flange. In the angle flange, a length of angle iron is welded along the edges of a trough to form flanges on either side. In a formed flange, the edges of the trough are bent away from the body of the trough to form flanges.

The flanges of a formed flange trough have continuous surfaces between the flange and the body of the trough which may be easily cleaned, while the angle flange trough has improved structural support and rigidity.

An angle flange trough has the disadvantage that a weather, dust or gas-tight seal is not provided between the body of the trough and the flange unless a continuous weld is made between the flange and the body of the trough. The use of a continuous weld, however, causes warpage and distortion. Also, a continuous weld customarily has cracks and crevices which retain dirt and food particles and make thorough cleaning very difficult. For this reason, the angle flange trough is not used for handling food products.

The formed flange trough while being easy to clean does not have the rigidity needed in many applications.

Among the purposes of the present invention is to provide a flanged trough having structural support and rigidity and which is easy to clean because of the smooth curve between the flange and the body of the trough. It is also an object of the present invention to provide a flanged trough which provides a weather-tight, dust-tight and gas-tight conduit. It is a further object of the invention to provide a trough in which the junction of the supporting member and the flanges of the trough are sealed outside the area of contact with material in the trough. Other objects and features will be in part apparent and in part pointed out hereinafter.

The invention accordingly comprises the constructions and methods hereinafter described, the scope of the invention being indicated in the following claims.

Figure 1:
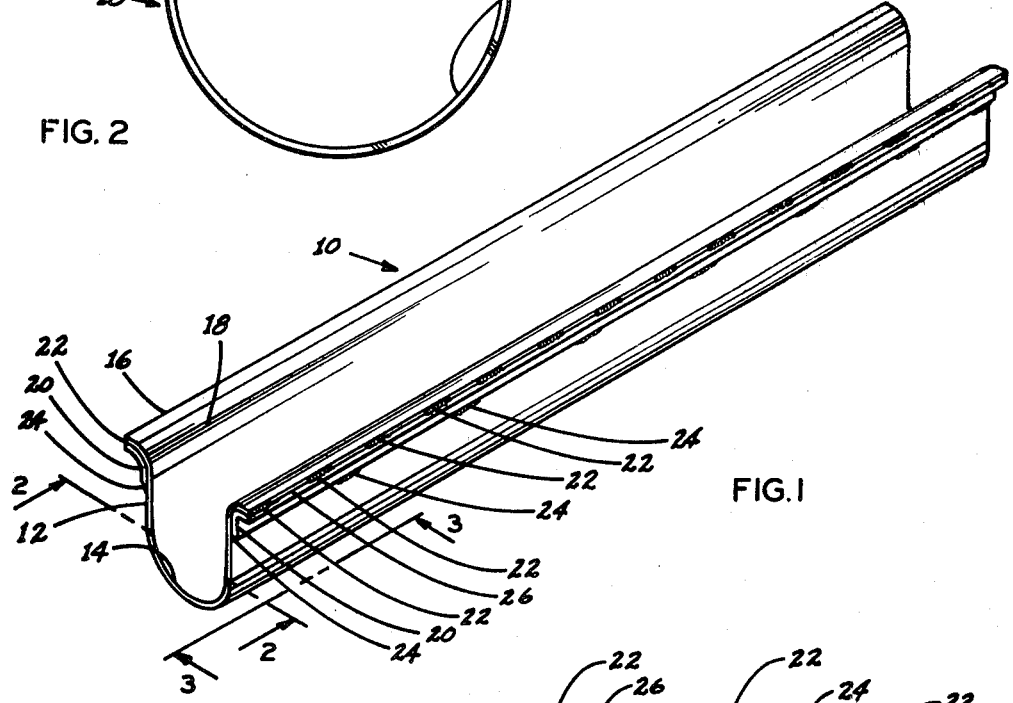
Figure 3:
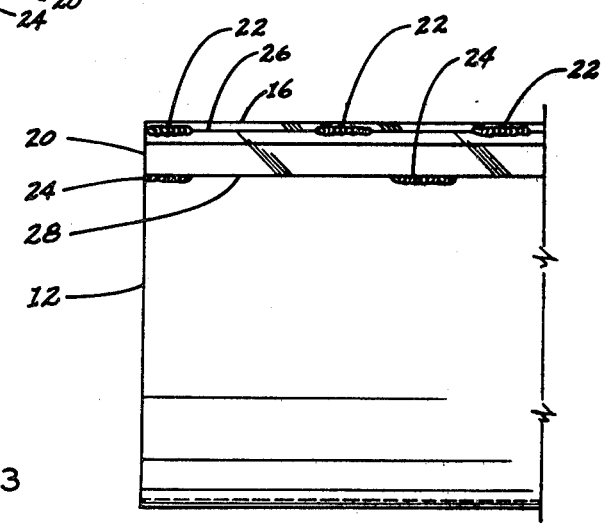

In the accompanying drawings, in which one of the various possible embodiments of the invention is illustrated, FIG. 1 is an overall view of the trough of the invention;

FIG. 2 is a view of a trough of the invention taken along section line 2—2 of FIG. 1 with a cover added; and FIG. 3 is an elevation illustrating a portion of the side of a trough of the invention taken along section line 3—3 of FIG. 1.

Corresponding reference characters indicate corresponding parts throughout the drawings.

FIGS. 1 and 2 show a trough 10 having a single metal sheet 12 forming the body of the trough. Sheet 12 may be made of mild steel or alloys such as is known for the fabrication of metal troughs.

Metal trough 10 has a rounded bottom 14 such as is used in tube type troughs for screws, chutes or other applications. The present invention can also be used in box type troughs wherein the bottom of the trough is square.

The edges of the trough are rounded to form flanges 16 having a smooth curve 18 between the trough body and flange 16. A metal plate or bar 20 is first welded to the underside of flanges 16 by welds 22 and 24 before the edges are rounded.

Welds 22 and 24 are preferred to be intermittent type welds such as shown in FIG. 3.

Bars 20 are welded on the edge of the sheet of metal before the trough is formed. The flat metal, which may be sized for the particular application or to the limits of the sheet metal stock available, is then formed by a press break having male and female dies into a trough as shown in FIG. 1 with metal bars 20 on the underside of flanges 16. The press break bends or forms the edges into flanges 16 having a smooth bend 18 between the flanges and the body of the trough.

The resulting trough has the rigidity of an angle flange trough without the warpage or distortion generally associated with an angle flange trough while providing a smooth surface 18 between flange 16 and the body of the trough 10 such that trough 10 is easily cleaned. This is particularly important in the food industry as bends 18 have no joints or seams in which dirt or particles of food might be retained.

As shown in FIGS. 1 and 2, each bar 20 is generally positioned such that its edge is even with the edge of the metal sheet before bars 20 are welded into place. The junction where bars 20 and the metal sheet come together can be sealed by a sealing means at joints 26 and 28 of FIG. 3. The cracks and crevices of welds 22 and 24 can also be covered with a sealant. The sealant may be butyl rubber or a similar sealant to provide a sanitary seat for use in the food industry.

As shown in FIG. 2, trough 10 may be covered with a cover or lid 30 having a gasket 32 between lid 30 and flanges 16 of the trough. With such a lid, the trough forms a weather-tight, dust-tight and gas-tight conduit. Gasket 32 also separates the junctions 26 between bars 20 and flange 16 from any product in trough 10. Lid 30 may be clamped or otherwise secured to the flanges of the trough to form the desired seal between lid 30 and flanges 16.

It will thus be seen that the invention provides a flanged trough especially valuable in the food industry, which may be easily cleaned where the junction between the supporting member and the trough is outside the contact area of material in the trough, where the trough has the structural support and rigidity of an angle flange trough but does not have the warpage or distortion associated with such a trough.

In view of the above, it will be seen that the several objects of the invention are achieved and other advantageous results obtained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of manufacturing a trough comprising welding a bar along each longitudinal edge of a metal sheet, forming the metal sheet into a trough, and bending the edges of the metal sheet and the bars welded thereto away from the body of the trough forming flanges having smooth curves along each side of the trough.

2. A method according to claim 1 wherein said welding step is intermittent.

3. A method according to claim 2 further comprising sealing the junction between the metal sheet and each metal bar for providing a sanitized seal.

4. A method according to claim 3 further comprising securing a lid to the trough and sealing the junction between said metal sheet and said lid for forming a weather-tight, dust-tight and gas-tight conduit.

5. A method according to claim 2 further comprising securing a lid to the trough and sealing the junction between said metal sheet and said lid for forming a weather-tight, dust-tight and gas-tight conduit.

6. A method according to claim 1 further comprising sealing the junction between the metal sheet and each metal bar for providing a sanitized seal.

7. A method according to claim 6 further comprising securing a lid to the trough and sealing the junction between said metal sheet and said lid for forming a weather-tight, dust-tight and gas-tight conduit.

8. A method according to claim 1 further comprising securing a lid to the trough and sealing the junction between said metal sheet and said lid for forming a weather-tight, dust-tight and gas-tight conduit.

* * * * *

UNITED STATES PATENT AND TRADEMARK OFFICE
CERTIFICATE OF CORRECTION

PATENT NO. : 4,445,260
DATED : May 1, 1984
INVENTOR(S) : David L. Buss

It is certified that error appears in the above-identified patent and that said Letters Patent is hereby corrected as shown below:

Column 2, line 36, "seat" should read --seal--.

Signed and Sealed this

Nineteenth Day of February 1985

[SEAL]

Attest:

DONALD J. QUIGG

Attesting Officer

Acting Commissioner of Patents and Trademarks